(12) United States Patent
Chertok

(10) Patent No.: US 6,914,351 B2
(45) Date of Patent: Jul. 5, 2005

(54) LINEAR ELECTRICAL MACHINE FOR ELECTRIC POWER GENERATION OR MOTIVE DRIVE

(75) Inventor: Allan Chertok, Bedford, MA (US)

(73) Assignee: TIAX LLC, Cambridge, MA (US)

(*) Notice: Subject to any disclaimer, the term of this patent is extended or adjusted under 35 U.S.C. 154(b) by 0 days.

(21) Appl. No.: 10/612,723

(22) Filed: Jul. 2, 2003

(65) Prior Publication Data

US 2005/0001500 A1 Jan. 6, 2005

(51) Int. Cl.[7] .............................................. H02K 41/00
(52) U.S. Cl. ........................................................ 310/12
(58) Field of Search ...................................... 310/12–14

(56) References Cited

U.S. PATENT DOCUMENTS

| | | |
|---|---|---|
| 3,891,874 A | 6/1975 | Roters et al. |
| 3,947,155 A | 3/1976 | Bidol |
| 3,949,249 A | 4/1976 | Wiseley et al. |
| 4,171,493 A | 10/1979 | Brimer et al. |
| 4,179,630 A | 12/1979 | Stuber |
| 4,198,743 A | 4/1980 | Stuber |
| 4,215,548 A | 8/1980 | Beremand |
| 4,220,907 A | 9/1980 | Pappas et al. |
| 4,227,142 A | 10/1980 | Jarret et al. |
| 4,239,975 A | 12/1980 | Chiappetti |
| 4,249,096 A | 2/1981 | Hickox |
| 4,259,653 A | 3/1981 | McGonigal |
| 4,270,054 A | 5/1981 | Dowd |
| 4,349,757 A | 9/1982 | Bhate |
| 4,363,980 A | 12/1982 | Petersen |
| 4,371,800 A | 2/1983 | Brander |
| 4,389,849 A | 6/1983 | Beggs et al. |
| 4,394,591 A | 7/1983 | Aronov et al. |
| 4,421,118 A | 12/1983 | Dow et al. |
| 4,432,204 A | 2/1984 | Walsh |
| 4,433,279 A | 2/1984 | Bhate |
| 4,434,617 A | 3/1984 | Walsh |
| 4,450,685 A | 5/1984 | Corey |
| 4,454,426 A | 6/1984 | Benson |
| 4,458,489 A | 7/1984 | Walsh |

(Continued)

FOREIGN PATENT DOCUMENTS

WO      WO 99/23744 A1    5/1999

OTHER PUBLICATIONS

Zhu,Q. et al., "Halbach Permanent Magnet Machines and Applications: A Review" IEE Proceedings, Electric Power Applications, Institution of Electrical Engineers, GB, vol. 148, No. 4, pp. 299–308, Jul. 6, 2001.

(Continued)

Primary Examiner—Thanh Lam
Assistant Examiner—Judson H. Jones
(74) Attorney, Agent, or Firm—Lowrie, Lando&Anastasi, LLP

(57) ABSTRACT

A linear electrical machine may function as an alternator or a motor. Three annular magnets may be provided that move relative to a core. The magnets may all have a different magnetic orientation. Two magnets may have a north pole oriented in a direction parallel to an axis along which the magnets move relative to the core. Another magnet may have a north pole oriented in a direction perpendicular to the axis.

41 Claims, 6 Drawing Sheets

U.S. PATENT DOCUMENTS

| | | |
|---|---|---|
| 4,500,827 A | 2/1985 | Merritt et al. |
| 4,518,882 A | 5/1985 | Morino et al. |
| 4,528,466 A * | 7/1985 | von der Heide et al. ..... 310/12 |
| 4,529,898 A | 7/1985 | Voloshin et al. |
| 4,532,431 A | 7/1985 | Iliev et al. |
| 4,538,964 A | 9/1985 | Brown |
| 4,542,311 A | 9/1985 | Newman et al. |
| 4,543,502 A | 9/1985 | Jarret et al. |
| 4,545,209 A | 10/1985 | Young |
| 4,546,663 A | 10/1985 | Wood |
| 4,567,726 A | 2/1986 | Vitale et al. |
| 4,578,956 A | 4/1986 | Young |
| 4,583,027 A | 4/1986 | Parker et al. |
| 4,583,364 A | 4/1986 | Wood |
| 4,594,521 A | 6/1986 | Schlicher |
| 4,601,765 A | 7/1986 | Soileau et al. |
| 4,602,174 A | 7/1986 | Redlich |
| 4,623,808 A | 11/1986 | Beale et al. |
| 4,642,547 A | 2/1987 | Redlich |
| 4,649,283 A | 3/1987 | Berchowitz et al. |
| 4,675,563 A | 6/1987 | Goldowsky |
| 4,692,673 A | 9/1987 | DeLong |
| 4,697,113 A | 9/1987 | Young |
| 4,713,939 A | 12/1987 | Keith |
| 4,721,440 A | 1/1988 | Hurst |
| 4,750,871 A | 6/1988 | Curwen |
| 4,761,960 A | 8/1988 | Higham et al. |
| 4,781,546 A | 11/1988 | Curwen |
| 4,792,708 A | 12/1988 | Boyer |
| 4,808,955 A | 2/1989 | Godkin et al. |
| 4,814,650 A | 3/1989 | Curwen et al. |
| 4,819,439 A | 4/1989 | Higham |
| 4,827,163 A | 5/1989 | Bhate et al. |
| 4,831,292 A | 5/1989 | Berry |
| 4,888,951 A | 12/1989 | Beale |
| 4,906,878 A | 3/1990 | Twaalfhoven et al. |
| 4,908,533 A | 3/1990 | Karita et al. |
| 4,912,746 A | 3/1990 | Oishi |
| 4,912,929 A | 4/1990 | Chen et al. |
| 4,922,159 A | 5/1990 | Phillips et al. |
| 4,924,123 A | 5/1990 | Hamajima et al. |
| 4,924,675 A | 5/1990 | Higham et al. |
| 4,937,481 A | 6/1990 | Vitale |
| 4,945,268 A | 7/1990 | Nihei et al. |
| 4,945,726 A | 8/1990 | Beale |
| 4,948,209 A | 8/1990 | Baker et al. |
| 4,965,864 A | 10/1990 | Roth et al. |
| 4,977,342 A | 12/1990 | Adams |
| 4,989,323 A | 2/1991 | Casper et al. |
| 5,003,777 A | 4/1991 | Berchowitz |
| 5,005,672 A | 4/1991 | Nakai et al. |
| 5,013,929 A | 5/1991 | Dhyanchand |
| 5,036,266 A | 7/1991 | Burke |
| 5,038,061 A | 8/1991 | Olsen |
| 5,039,894 A | 8/1991 | Teter et al. |
| 5,040,372 A | 8/1991 | Higham |
| 5,057,724 A | 10/1991 | Patton |
| 5,115,158 A | 5/1992 | Vaillant de Guelis et al. |
| 5,126,604 A | 6/1992 | Manning |
| 5,146,123 A | 9/1992 | Yarr |
| 5,146,124 A | 9/1992 | Higham et al. |
| 5,148,066 A | 9/1992 | Beale et al. |
| 5,151,695 A | 9/1992 | Rollwitz et al. |
| 5,156,005 A | 10/1992 | Redlich |
| 5,160,447 A | 11/1992 | Ishikawa et al. |
| 5,172,160 A * | 12/1992 | Van Eijk et al. ............... 355/53 |
| 5,175,457 A | 12/1992 | Vincent |
| 5,180,939 A | 1/1993 | Rosswurm |
| 5,214,371 A | 5/1993 | Naidu |
| 5,219,034 A | 6/1993 | Wortham |
| 5,220,223 A | 6/1993 | Mehnert |
| 5,235,225 A | 8/1993 | Colgate et al. |
| 5,246,353 A | 9/1993 | Sohn |
| 5,261,799 A | 11/1993 | Laskaris |
| 5,298,825 A | 3/1994 | Oudet et al. |
| 5,340,400 A | 8/1994 | Schmidt et al. |
| 5,342,176 A | 8/1994 | Redlich |
| 5,347,186 A | 9/1994 | Konotchick |
| 5,349,256 A | 9/1994 | Holliday |
| 5,349,258 A | 9/1994 | Leupold et al. |
| 5,385,021 A | 1/1995 | Beale |
| 5,389,844 A | 2/1995 | Yarr et al. |
| 5,397,922 A | 3/1995 | Paul et al. |
| 5,406,152 A | 4/1995 | Fechner et al. |
| 5,418,066 A | 5/1995 | Chen et al. |
| 5,432,382 A | 7/1995 | Pawlowski |
| 5,446,319 A | 8/1995 | Pawlowski |
| 5,496,153 A | 3/1996 | Redlich |
| 5,502,968 A | 4/1996 | Beale |
| 5,519,267 A | 5/1996 | Pentecost |
| 5,525,845 A | 6/1996 | Beale et al. |
| 5,528,951 A | 6/1996 | Takahashi et al. |
| 5,537,820 A | 7/1996 | Beale et al. |
| 5,554,012 A | 9/1996 | Itakura |
| 5,587,615 A | 12/1996 | Murray et al. |
| 5,602,432 A | 2/1997 | Mizutani |
| 5,613,188 A | 3/1997 | Piech et al. |
| 5,642,622 A | 7/1997 | Berchowitz et al. |
| 5,645,407 A | 7/1997 | Kralick et al. |
| 5,696,413 A | 12/1997 | Woodbridge et al. |
| 5,705,902 A | 1/1998 | Merritt et al. |
| 5,715,693 A | 2/1998 | van der Walt et al. |
| 5,723,917 A | 3/1998 | Chitayat |
| 5,753,985 A | 5/1998 | Redlich |
| 5,775,273 A | 7/1998 | Beale |
| 5,818,131 A | 10/1998 | Zhang |
| 5,818,132 A | 10/1998 | Konotchick |
| 5,850,111 A | 12/1998 | Haaland |
| 5,873,246 A | 2/1999 | Beale |
| 5,886,442 A | 3/1999 | Ogino et al. |
| 5,903,069 A | 5/1999 | Hiterer |
| 5,907,201 A | 5/1999 | Hiterer et al. |
| 5,909,068 A | 6/1999 | Wakiwaka et al. |
| 5,920,133 A | 7/1999 | Penswick et al. |
| 5,945,749 A | 8/1999 | Li |
| 5,965,964 A | 10/1999 | Skinner et al. |
| 5,982,073 A | 11/1999 | Lashmore et al. |
| 6,003,230 A | 12/1999 | Trumper et al. |
| 6,035,637 A | 3/2000 | Beale et al. |
| 6,060,804 A | 5/2000 | Fujita et al. |
| 6,060,810 A | 5/2000 | Lee et al. |
| 6,064,129 A | 5/2000 | Pompei |
| 6,069,420 A | 5/2000 | Mizzi et al. |
| 6,072,251 A | 6/2000 | Markle |
| 6,072,259 A | 6/2000 | Kawabata |
| 6,077,054 A | 6/2000 | Lee et al. |
| 6,084,320 A | 7/2000 | Morita et al. |
| 6,104,108 A | 8/2000 | Hazelton et al. |
| 6,107,715 A | 8/2000 | Patterson et al. |
| 6,111,332 A | 8/2000 | Post |
| 6,129,790 A | 10/2000 | Lashmore et al. |
| 6,141,971 A | 11/2000 | Hanes |
| 6,157,100 A | 12/2000 | Mielke |
| 6,169,343 B1 | 1/2001 | Rich, Sr. |
| 6,170,442 B1 | 1/2001 | Beale |
| 6,172,426 B1 | 1/2001 | Galich |
| 6,188,204 B1 | 2/2001 | Vithayathil et al. |
| 6,199,381 B1 | 3/2001 | Unger et al. |
| 6,239,517 B1 | 5/2001 | Nakamura et al. |
| 6,251,514 B1 | 6/2001 | Lashmore et al. |
| 6,262,500 B1 | 7/2001 | Wakiwaka et al. |

| | | |
|---|---|---|
| 6,309,748 B1 | 10/2001 | Lashmore et al. |
| 6,313,551 B1 * | 11/2001 | Hazelton ............... 310/12 |
| 6,316,849 B1 | 11/2001 | Konkola et al. |
| 6,326,706 B1 | 12/2001 | Zhang |
| 6,340,397 B1 | 1/2002 | Lashmore et al. |
| 6,342,108 B1 | 1/2002 | Lashmore et al. |
| 6,369,469 B1 | 4/2002 | Murray |
| 6,401,001 B1 | 6/2002 | Jang et al. |
| 6,427,450 B1 | 8/2002 | Hanes ..................... 62/6 |
| 6,462,439 B1 | 10/2002 | Denne |
| 6,483,207 B1 | 11/2002 | Redlich |
| 6,492,748 B1 | 12/2002 | Corey |
| 6,653,753 B1 * | 11/2003 | Kawano et al. ......... 310/14 |
| 2001/0042983 A1 | 11/2001 | Kinoshita |

OTHER PUBLICATIONS

Jang, Seak Myeong et al., "Analysis of the Tubular Motor with Halbach and Radial Magnet Array" Conference Proceedings Article, vol. 1, pp. 250–252, Nov. 9, 2003.

Cawthorne, W., "Integrated Design of Linear Alternator/Engine System for HEV Auxiliary Power Unit", West Virginia University, pp. 1–8. 2001, month unknown.

Trumper, D. et al., "Magnet Arrays for Synchronous Machines," Electrical Engineering Dept., University of N. Carolina at Charlotte, Charlotte, NC, IEEE, pp. 9–18, 1993, month unknown.

Kim, W.J. et al., "Analysis and Implementation of a Tubular Motor with Halbach Magnet Array; " IEEE, pp. 471–478, 1996, month unknown.

Ofori–Tenkorang, J. et al., "A Comparative Analysis of Torque Production in Halbach and Conventional Surface––Mounted Permanent–Magnet Synchronous Motors", IEEE, 1995, pp. 657–663, month unknown.

Ramsden, V.S. et al., "Design of an In–Wheel Motor for a Solar–Powered Electric Vehicle", printed Jan. 31, 2003 from www.TIP.SCIRO.AU/MACHINES/PAPERS/IWSCEM; pp. 1–9.

Redlich, R. , "A Summary of Twenty Years Experience with Linear Motors and Alternators", paper prepared for distribution at exhibit by Sunpower, Inc., LDIA, May 31–Jun. 2, 1995, Nagasaki, Japan.

* cited by examiner

US 6,914,351 B2

LINEAR ELECTRICAL MACHINE FOR ELECTRIC POWER GENERATION OR MOTIVE DRIVE

BACKGROUND OF INVENTION

1. Field of Invention

The invention relates to a linear electrical machine for electric power generation or motive drive.

2. Discussion of Related Art

Quiet and efficient electric power generation can be important in a variety of applications. For example, boats and other spaces having power generation systems in close proximity to people have a need for quiet operation. As a result, turbines, internal combustion engines and other power sources are often far too noisy for use in such applications. Free piston Stirling engines, however, operate fairly quietly and have been used to drive linear electrical machines also referred to as linear alternators to generate electric power. (The term "alternator" is used herein to generically refer to any type of electric power generation device, whether producing alternating current, direct current, or other forms of electric power. Except for the case of the automotive "alternator" which has a built in rectifier to provide 12 volt DC output, the term "alternator" would otherwise be understood to be an electrical machine which produces AC power.) These power generation systems are typically best suited by a linear alternator that can operate efficiently within the range of motion of a piston in the free piston Stirling engine (FPSE) that drives the alternator.

SUMMARY OF INVENTION

In one aspect of the invention, a linear electrical machine is provided that is suitable for use in electric power generation. In one embodiment, the linear electrical machine may be driven by a free piston Stirling engine or other linear motion primemover to generate electric power.

In another aspect of the invention, a linear electrical machine is provided that is suitable for use as a linear motor.

In another aspect of the invention, a linear electrical machine includes a coil adapted to carry electrical current, and a core disposed at least partially around the coil that provides a relatively low reluctance path for a magnetic flux which links with the coil, the core having a central opening. A movable element having a longitudinal axis is adapted to linearly reciprocate in the central opening along the longitudinal axis. The movable element has only first, second and third magnets arranged along the longitudinal axis. The first magnet is adjacent the second magnet, and the second magnet is adjacent the third magnet. Each of the first, second and third magnets have a different magnetic orientation. In one embodiment, the first, second and third magnets may be hollow, e.g., with an annular or polygonal cross-sectional shape.

In another aspect of the invention, a linear electrical machine includes a coil adapted to carry electrical current, and a core disposed at least partially around the coil that provides a relatively low reluctance path for a magnetic flux which links with the coil. The core has an annular shape with a central opening. A movable element has a longitudinal axis adapted to linearly reciprocate in the central opening along the longitudinal axis. The movable element has three magnets arranged along the longitudinal axis that are adjacent each other. The magnets each have a different magnetic orientation such that the magnetic orientations of adjacent magnets are within 90 degrees of each other. A soft magnetic material is positioned within the magnets that provides a path for flux driven by a magnetic field generated by the magnets which links with the coil.

In another aspect of the invention, a linear electrical machine includes a coil adapted to carry electrical current, and a core disposed in relation to the coil to provide a path for a magnetic flux adjacent the coil. First, second and third magnets are arranged along a longitudinal axis to interact with a magnetic flux in the core. The first magnet is adjacent the second magnet, and the second magnet is adjacent the third magnet. Each of the first, second and third magnets have a different magnetic orientation such that one of the magnets has a north pole oriented perpendicular to the longitudinal axis and the other two magnets have a north pole oriented parallel to the longitudinal axis. All magnets having a magnetic orientation perpendicular to the longitudinal axis are oriented so the north pole of all such magnets is either radially inward or radially outward, and at least one of the magnets and the coil is arranged to move relative to the other in a linear direction parallel to the longitudinal axis.

In another aspect of the invention, a linear electrical machine includes a coil adapted to carry electrical current, and a core disposed in relation to the coil to provide a path for a magnetic flux which links with the coil. First, second and third magnets are arranged along a longitudinal axis to interact with a magnetic flux in the core which links with the coil. The first magnet is adjacent the second magnet, and the second magnet is adjacent the third magnet. Each of the first, second and third magnets have a different magnetic orientation such that one of the magnets has a north pole oriented perpendicular to the longitudinal axis and the other two magnets have a north pole oriented parallel to the longitudinal axis. At least one of the magnets and the core-coil unit is arranged to move relative to the other in a linear direction parallel to the longitudinal axis, and the first, second and third magnets each have a length in the longitudinal direction that is greater than one-half of a maximum amount of relative movement of the magnets and the core-coil unit along the longitudinal axis.

In another aspect of the invention, a linear electrical machine includes a coil adapted to carry electrical current, and a core disposed in relation to the coil to provide a path for a magnetic flux which links with the coil, the core having a gap. First, second and third magnets are arranged along a longitudinal axis to interact with a magnetic flux in the core which links with the coil. The first magnet is adjacent the second magnet, and the second magnet is adjacent the third magnet. One of the first, second and third magnets have a magnetic orientation such that a north pole of the magnet is oriented parallel to the longitudinal axis. A fourth magnet is positioned in the gap of the core, and at least one of the first, second and third magnets and the coil is arranged to move relative to the other in a linear direction parallel to the longitudinal axis. The magnetic orientation of the fourth magnet is arranged to urge one of the first, second and third magnets to align with the core.

In another aspect of the invention, a linear electrical machine includes a coil adapted to carry electrical current, and a core disposed at least partially around the coil that provides a path for a magnetic flux. The core has an annular shape with a central opening and is formed from a powdered, soft magnetic substance. A movable element having a longitudinal axis is adapted to linearly reciprocate in the central opening along the longitudinal axis, and has magnets arranged along the longitudinal axis.

These and other aspects of the invention will be apparent and/or obvious from the following description.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
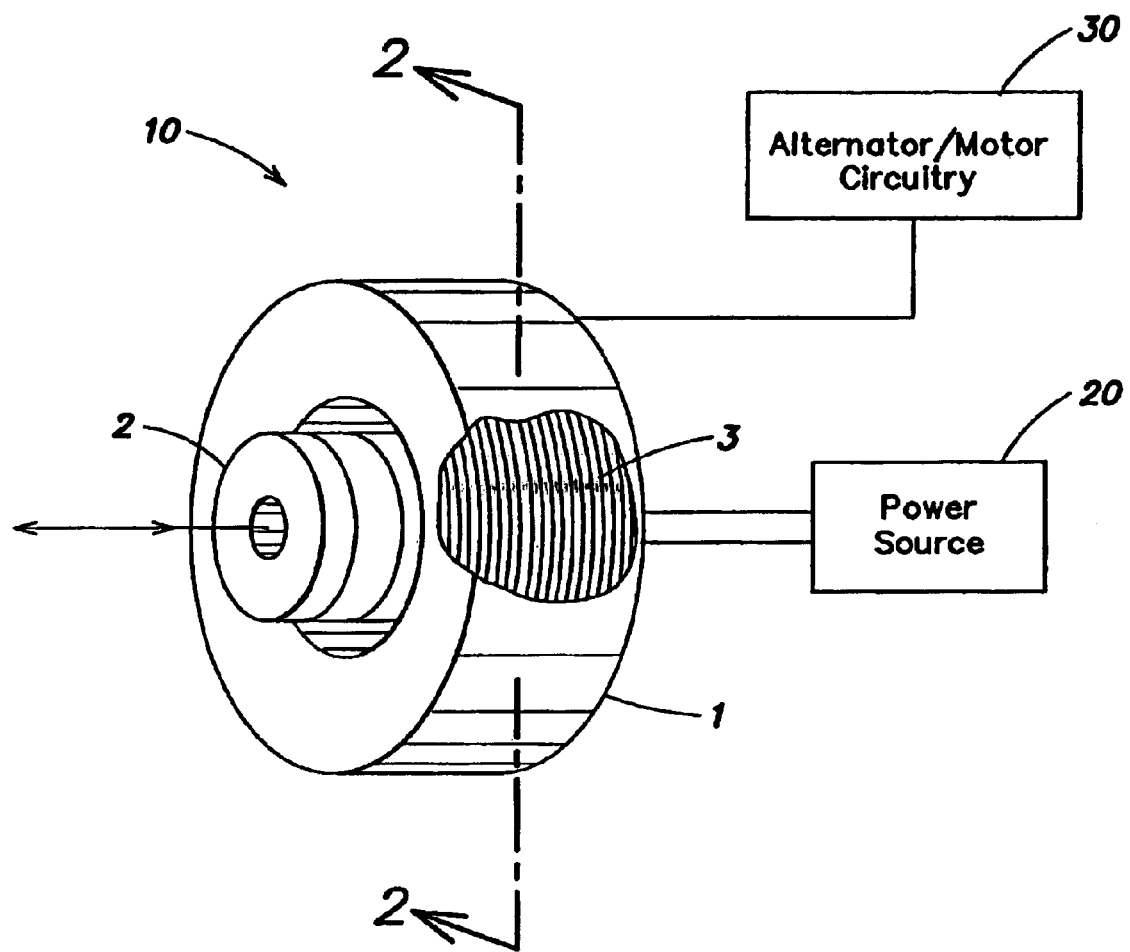
FIG. 1 is a schematic view of a linear electrical machine in accordance with the invention coupled to an illustrative power source.

Aspects of the invention are not limited to the details of construction and arrangement of components set forth in the following description or illustrative embodiments. That is, aspects of the invention are capable of being practiced or of being carried out in various ways. For example, various illustrative embodiments are described below in connection with an electric power generator. However, aspects of the invention may be used in a linear motor (e.g., a device that can output a linear mechanical motion in response to an electric signal provided to the device). Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

In one aspect of the invention, a linear electrical machine includes a movable permanent magnet "field" element that moves along a longitudinal axis in a central opening of an armature coil embedded in a ferromagnetic armature core, these latter components comprising an armature unit. The core provides a relatively low reluctance path for magnetic flux, thus enhancing the coil flux linkage produced by the field element. When the linear electrical machine serves as an alternator, electrical power is produced as a consequence of field element motion provided by a free piston Stirling engine or other primemover which motion induces an armature coil voltage proportional to the temporal rate of change of the coil flux linkage developed by the permanent magnets. Electrical power is produced when this induced voltage drives a current through an electrical load. The interaction of the magnetic flux developed by the coil current and the field element produces the reaction force that must be overcome by the free piston Stirling engine or other primemover. The instantaneous mechanical input power is given by the product of instantaneous values of reaction thrust and field element linear velocity.

When the linear electrical machine serves as a motor, mechanical power is produced as a consequence of thrust developed by the field element and the resulting motion of a mechanical load driven by it. The thrust developed by the field element is proportional to the spatial rate of change of the coil flux linkage developed by the permanent magnets and a coil current driven by an electrical power source. The voltage induced in the coil by the moving field element must be overcome by the electrical power source so that it may drive the coil current. The instantaneous electrical input power is given by the product of instantaneous values of coil terminal voltage and coil current.

In one aspect of the invention, the movable element may include three magnets that all have a different magnetic orientation. For example, a first magnet may have a north pole oriented in a first direction parallel to the longitudinal axis, a second magnet may have a north pole oriented in a second direction perpendicular to the longitudinal axis, and a third magnet may have a north pole oriented in a third direction parallel to the longitudinal axis that is different from the first direction. This arrangement may provide for a concentrated magnetic flux generated by the movable element that maximizes power generation in the coil while minimizing stray magnetic fields and ferromagnetic magnetic circuit material (also known as "back iron") needed to carry the magnetic flux.

Such an arrangement may also be effective in minimizing the residual unbalanced transverse force exerted on the movable field element (a force that urges the movable element to deviate from a particular path along the longitudinal axis). Residual unbalanced transverse force may arise due to mechanical eccentricity of the movable field element relative to the central opening in the core such that the transverse force of attraction between the moving magnet element and the core is not uniform about its circumference due to non-uniformity of the air gap reluctance between these elements. Linear electric machines in accordance with one aspect of the invention employ magnets having a radial thickness dimension larger than prior art electrical machines of comparable thrust and power ratings. As the permeability of the magnet material is very low (nearly that of free space), the effective air gap between the moving field element and the central opening of the core is much greater than that of the mechanical clearance gap alone. The magnetic circuit reluctance of this effective air gap may serve to reduce the transverse attractive radial force exerted on the moving field element and hence any residual unbalance force due to mechanical eccentricity. This suppression of unbalanced radial force is attained by some embodiments of the present invention to a greater extent than prior art linear electric machines which employ thinner magnet components and a thicker back iron element, which configuration typically offers less air gap reluctance.

In another aspect of the invention, the movable element may include a back iron element of soft magnetic (magnetizable) material that provides a path for magnetic flux driven by the magnetic field created by the magnets in the movable element. The soft magnetic material may serve to better concentrate the magnetic flux and prevent stray magnetic fields, thereby increasing the efficiency of the device.

In another aspect of the invention, three magnets provided on a movable element may have magnetic orientations that are all different from each other and arranged so that the magnetic orientation of adjacent magnets are within 90 degrees of each other. The magnets may be annular magnets that are made as one piece, or may be annular magnets that are made from an assembly of magnets.

In another aspect of the invention, three magnets provided in a movable element may have magnetic orientations arranged so that all magnets having a north pole oriented in a direction perpendicular to the longitudinal axis have the north pole arranged radially inward.

FIG. 1 shows a linear electrical machine 10 that incorporates various aspects of the invention. In this illustrative embodiment, the linear electrical machine 10 functions to generate electric power when the movable element 2 is moved linearly by a power source 20 relative to a coil 3 embedded in a core 1. The power source 20 may be any suitable device that causes the movable element 2 to move, such as a free piston Stirling engine, or other linear motion primemover. Of course, the power source 20 may be replaced with another device that is driven by the linear electrical machine 10, e.g., when the linear electrical machine 10 acts as a linear motor. For example, electric drive signals may be provided to the coil 3 embedded in the core 1 so that a varying magnetic field is generated, causing the movable element 2 to reciprocate relative to the core 1. This motion may perform work, such as driving a compressor, etc. In short, the linear electrical machine 10 may operate as an alternator or as a motor.

The linear electrical machine 10 may be linked to an electrical load which may in one instance be suitable electronic circuitry 30 to receive electric current driven by the coil 3 as the movable element 2 moves relative to the core 1. As will be understood, such electronic circuitry can include any suitable components to convert the alternating current power provided by the electrical machine to any suitable form of electric power, e.g., AC, DC or other electric current forms. The electrical machine, again serving as an alternator, may also be connected to a load which is directly compatible with the frequency and amplitude of the alternating voltage it develops and requires no separate electronic power conversion means. Alternatively, the electrical machine serving as an alternator may also be connected to a power system of much larger capacity such as a utility power grid and will supply power to that system.

If the linear electrical machine 10 serves as a linear motor, the electronic circuitry 30 may include suitable control circuitry or other components, such as switches, relays, mechanical linkages, etc., to control the operation of the linear motor. Such circuitry and other components are well known in the art and additional details are not provided herein. Alternatively the electrical machine may be operated as a motor by connection to a non-electronic power source such as a utility power grid provided first that oscillation of the motor at the power system frequency is acceptable for the application and second that the coil is designed to provide an appropriate back emf incrementally lower than the system voltage such that the current drawn from the system is that required to develop the rated mechanical thrust.

Figure 2:
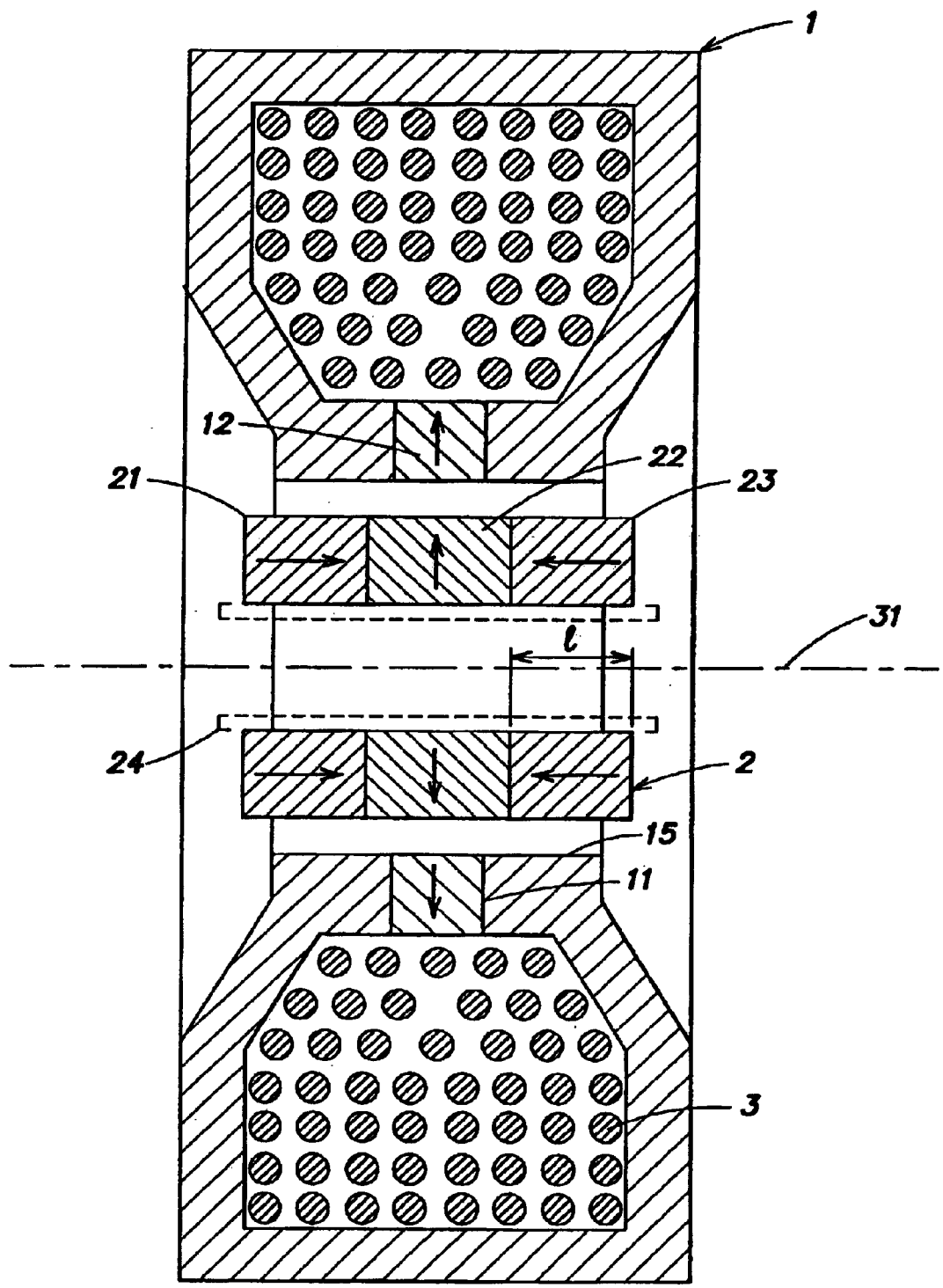
FIG. 2 is a cross-sectional view of the linear electrical machine shown in FIG. 1.

FIG. 2 shows a cross-sectional view of the linear electrical machine 10 along the line 2—2 in FIG. 1. In this illustrative embodiment, the core 1 has an approximately annular or toroidal shape with a central opening 15 in which the movable magnet field element 2 is positioned, although the core 1 may take any other suitable shape. The core 1 provides a relatively low reluctance path for a magnetic flux that may be formed around the coil 3 positioned at least partially in the core 1. As the magnetic flux changes in the core 1 (e.g., as the movable element 2 moves), a voltage will be induced in the coil 3 which can serve to drive an electric current through an external electrical load connected to the coil terminals (not shown) The coil 3 may include multiple wraps of conductive wire, such as copper wire, in which the induced current may flow. Alternately, a current flow in the coil 3 may produce a changing magnetic flux in the core 1 that causes the movable element 2 to be driven along the longitudinal axis 31.

One aspect of the invention illustrated in FIG. 2 is that the movable element 2 includes three magnets 21, 22 and 23 that all have a different magnetic orientation. In this illustrative embodiment, the three magnets 21, 22 and 23 are permanent magnets are hollow and have an annular shape, although the magnets may have any suitable polygonal cross-sectional shape. The first magnet 21 has a north pole oriented in a first direction parallel to the longitudinal axis 31. The second magnet 22 has a north pole oriented in a second direction perpendicular to the longitudinal axis (in this case the north pole is oriented radially outward). The third magnet 23 has a north pole oriented in a third direction parallel to the longitudinal axis 31 opposite the first direction. This arrangement efficiently uses the magnetic fields generated by the magnets so that a focused flux is created near the core 1 and a relatively high flux can be induced in the core 1 for a relatively small amount (by mass or volume) of magnet material. In particular, this arrangement of the magnets produces a magnetic flux that is concentrated on a side nearest the core 1, and produces minimal flux on the side opposite the core 1, e.g., inside the movable element 2. Other orientations are possible for the magnets, such as having the first and third magnets 21 and 23 oriented toward the second magnet, but at an angle to the longitudinal axis 31. Similarly, the north pole of the second magnet 22 need not be strictly perpendicular to the longitudinal axis 31, but may be at some other suitable angle relative to the longitudinal axis 31. The second magnet 22 may also be formed from two or more magnets, e.g., two adjacent annular magnets, that each have a magnetic orientation transverse to the longitudinal axis 31 and together operate as a single magnet having a magnetic orientation perpendicular (or otherwise suitably oriented) to the axis 31.

Figure 3:
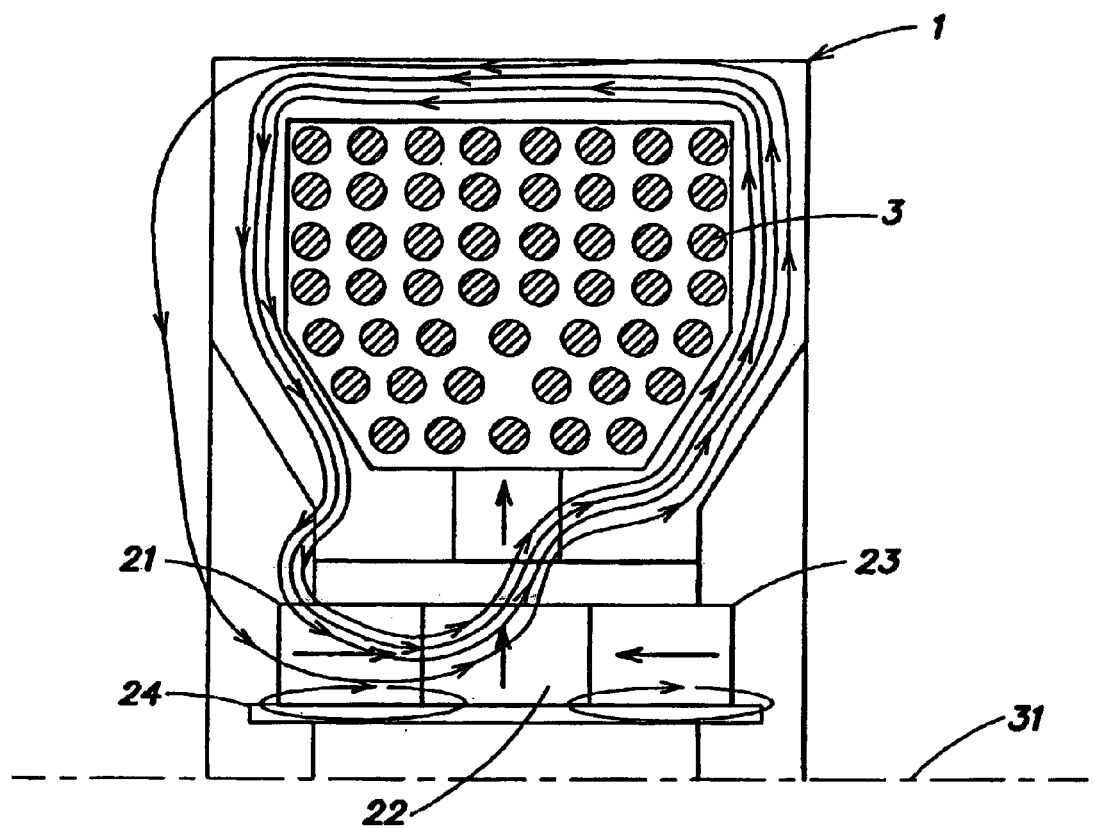
FIG. 3 shows exemplary magnetic field lines in one illustrative embodiment.

FIG. 3 shows an exemplary set of magnetic flux lines that may be created as the movable element 2 moves along the longitudinal axis. It should be understood that the field lines shown in FIG. 3 is not a complete set of field lines, but rather only selected field lines are shown to help simplify explanation of the operation of the magnets 21, 22 and 23 in the movable element 2. It should also be understood that in FIG. 3 it is assumed that coil current is flowing out of the cross-section indicated). In this example, as the movable element 2 moves to the right along the longitudinal axis 31, a majority of the magnetic flux created by the magnets 21, 22 and 23 exits the second magnet 22, crosses the gap between the movable element 2 and the core 1, enters the core 1 and generally flows counterclockwise around the core 1. The core flux produced by coil current (also known as "armature reaction") augments the core flux component due to the field magnet element on the left face of the core while diminishing it on the other, thus giving rise to the asymmetrical distribution of core flux depicted in FIG. 3. After traveling around the core 1, the field lines again cross the gap between the core 1 and the movable element 2 and enter the first magnet 21. As will be understood, movement of the movable element 2 varies the flux in the core 1 linking the coil 3, thereby inducing a voltage proportional to the temporal rate of change of this flux linkage which may drive a current flow in the coil 3 and an external electrical load. For example, as the movable element 2 moves to the left (not shown in FIG. 3), the magnetic flux flowing in a counter-clockwise direction will decrease until the flux begins to flow in a clockwise direction producing a temporal rate of change of coil flux linkage and induced voltage of opposite sign to that obtained in the case of field element motion to the right.

This basic flux reversal is common in many linear alternators, but the arrangement of the magnetic orientations of the magnets 21, 22 and 23 serves to better focus the flux, prevent stray magnetic fields that do not contribute to flux flowing in the core 1, and therefore improves either the performance of the linear electrical machine or enables a smaller, lighter and less costly construction for a given performance requirement. For example, the better focused flux means that less magnet material is needed to produce an efficient linear electrical machine. In one embodiment, the large effective air gap of the radially thick magnet structure reduces the variability of magnetic circuit reluctance due to residual eccentricity of the moving field magnet element with respect to the core and hence undesired unbalanced transverse force acting on this element which would tend to urge the movable element away from reciprocation along the longitudinal axis 31. As a result, devices that help keep the movable field magnet element 2 moving along a desired path, such as bearings, guideways, etc., will develop smaller undesired frictional losses. Alternatively, reduced transverse loading of such bearings or guideways may permit use of self-lubricating materials, thus avoiding the complexity and expense of lubrication mechanisms and maintenance. In addition, such an arrangement may enable applications which cannot accommodate lubricant contamination, as is the case when a linear electrical machine is integrated within the pressure vessel of a free piston Stirling engine.

Another aspect of the invention illustrated in FIG. 2 is that a back iron element of soft magnetic (magnetizable) material 24 may be provided inside the annular magnets. Although the back iron or other soft magnetic material 24 is optional, it may provide a low reluctance path for flux driven by the magnetic field generated by the magnets. Thus, the back iron may improve the efficiency or power capability of the linear electrical machine by reducing stray magnetic fields and appropriately directing the magnetic flux in a desired way. Because of the focused magnetic field generated by the arrangement of magnets 21, 22 and 23 results in most of the magnetic flux being directed toward the core 1, the back iron 24 may carry little magnetic flux and have a minimal thickness to function effectively. The reduced weight of the back iron 24 may reduce the mass of the movable element 2, thereby improving efficiency or power capability of the linear electrical machine 10 and the associated mechanical apparatus. For example in the case of a linear electrical machine driven by a free piston Stirling engine, a reduction in the moving mass may permit operation of the engine power piston and the alternator moving field element at a higher frequency, thus increasing the power generation capacity of the engine-alternator system in almost direct proportion to the increase of allowable operating frequency. The back iron may also physically support the magnets and connect the movable element to the power source 20 or other device.

Another aspect of the invention illustrated in FIG. 2 is that the magnets 21, 22 and 23 may have a length l along the longitudinal axis 31 that is greater than a maximum left or right displacement of the movable element 2. Said another way, the length l for the magnets 21, 22 and 23 may be greater than ½ the total stroke length of the movable element 2. For example, the magnets 21, 22, and 23 may have a length l that is approximately 10 mm and the movable element 2 may have a maximum displacement along the longitudinal axis 31 of +/−8 mm. Limiting the stroke of the movable element 2 to less than two times the length l of the magnets, or conversely selecting a length l greater than the maximum left/right displacement of the movable element, may provide improved control over how the magnetic flux changes as the movable element reciprocates and for example, in the case of an alternator application, reduce the variation of the electrical machine instantaneous induced voltage/field velocity ratio over the range of operational displacement. Therefore, the linear electrical machine may be made to operate consistently within a set of design parameters.

Another aspect of the invention illustrated in FIG. 2 is that a magnet is provided apart from the movable element to urge the movable element to suitably align the magnets with the coil-core assembly. In this illustrative embodiment, the core 1 includes a spring magnet 12 that is located in a gap 11 in the core 1. The spring magnet 12 may provide a spring-like force that urges the movable element 2 to move approximately to the position shown in FIG. 2. That is, the spring magnet 12 has its magnetic field oriented so that if the movable element 2 is moved from a rest position shown in FIG. 2, the spring magnet 12 causes a force to be created that urges the magnetic field of the second magnet 22, augmented by that of side magnets 21 and 23, to align with the magnetic field of the spring magnet 12. Therefore, any force that moves the movable element 2 left or right from the position shown in FIG. 2 will be opposed by a force that urges the magnetic fields of the spring magnet 12 and the second magnet 22 to align. Other arrangements for the spring magnet 12 may be used to provide the desired biasing of the movable element 2, such as placing two magnets on opposite sides of the core 1 near the first and third magnets 21 and 23. The spring magnet 12 may make start up of the linear electrical machine 10 and associated driving or driven apparatus easier since the movable element may tend to be in a known rest position when the linear electrical machine is inactive. For example, if the spring magnet 12 was not present in the FIG. 2 apparatus, the movable element 2 would be normally urged to move either left or right out of the central opening 15 in the core 1. With the spring magnet 12 in place, the movable element 2 has a rest position as shown in FIG. 2.

The spring magnet 12 can also function to provide the linear electrical machine 10 with a positive spring rate so the force needed to displace the movable element 2 from the rest position increases with increasing displacement. Without the spring magnet 12 in this embodiment, the apparatus would have a negative spring rate over most of the stroke of the movable element, which may be desirable in some applications, but is generally not desirable when the linear electrical machine 10 is used in power generation. The spring magnet 12 cross-section dimensions and magnetic material properties can be adjusted to achieve a nominally constant spring rate over the operating displacement range of the movable element 2 with optional augmentation of the rate near the central position. This feature may be desirable in power generation applications, for example where the moving field element is driven by the piston of a free piston Stirling engine. Here the magnetic spring rate in concert with a pneumatically developed component acts with the total mass of the moving elements (electrical machine and primemover) to achieve the desired mechanically resonant operation of the electrical machine and primemover system. Additionally the positive magnetic spring rate, optionally augmented in the vicinity of zero displacement by adjustment of the spring magnet 12 cross-section dimensions and magnetic material properties, provides means to assure that the mean piston position does not drift from a desired fixed station.

The spring magnet 12 may also function to move a portion of the power source 20 (as well as the movable element 2) when the system is inactive. For example, if the power source 20 includes a free piston Stirling engine, the force of the spring magnet 12 may cause a piston of the Stirling engine to move to a known central position that allows easier start up of the Stirling engine. In this regard, the linear electrical machine 10 may be briefly driven by an electrical current applied to the coil 3 so the linear electrical machine acts as a linear motor to move the Stirling engine piston during start up.

Figure 4:
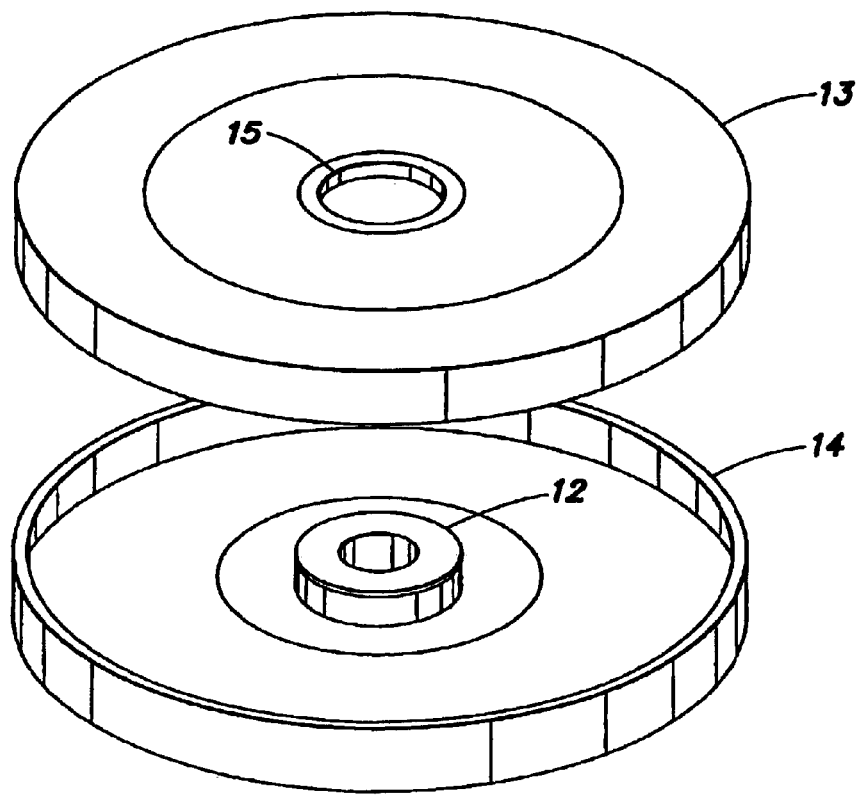
FIG. 4 is a schematic view of a two-part core.

FIG. 4 shows a perspective view of a core 1 in an illustrative embodiment. In one aspect of the invention, the core 1 may be made in a split arrangement having two halves 13 and 14. In this way, the coil 3, after being pre-wound on a split bobbin fixture and mechanically stabilized by chemical or thermal fusing of a bonding coat applied to the wire or by impregnation with a bonding agent such as electrical grade varnish or epoxy resin, may be inserted into the cavity (after removal of the split bobbin winding fixture) between the two halves 13 and 14. The halves 13 and 14 may then be assembled in a clam-shell type arrangement to at least partially surround the coil with core material. The spring magnet 12, which may have an annular shape, may also be inserted between the core halves 13 and 14 in the gap 11 near the central opening 15. The cores may be provided with piloting details on the inner or outer rims to assure their concentric alignment. As a final assembly step an encapsulant may be injected to fill voids between coil turns and between the coil and the core cavity. The encapsulant bridging these voids may also serve to facilitate transfer of coil heat dissipation to the core and in turn to the housing in which the core is mounted. The encapsulant may also serve to permanently secure the coil, optional spring magnet and core halves.

In another aspect of the invention, the core 1 may be made from a coated, magnetically soft, ferromagnetic powder metal material that is pressed and bonded together in the net or near net shape of the core. Although the specific types of material may vary, in one embodiment, the powder metal material includes small particles of soft magnetic material each surrounded by a layer of electrically insulating material, such as an insulating plastic. The particles may be joined together by forming the particles into the desired shape, and then heating and pressing the particles together so the insulating layers on adjacent particles bond together. The resulting structure has favorable magnetic properties for this application, i.e., high permeability, high saturation flux density and low hysteretic loss, but is highly resistant to eddy currents flowing through the structure and consequent losses due to the flow of such currents. Such powder metal forming techniques are described, for example, in U.S. Pat. 6,342,108. An illustrative powder material is Atomet EM-1 Ferromagnetic Composite powder manufactured by Quebec Metal Powders.

Figure 5:
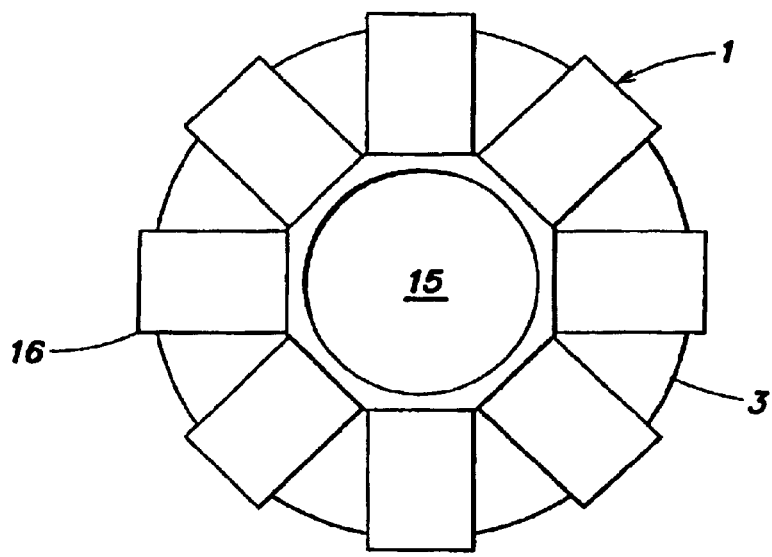
FIG. 5 is a schematic view of a core having an array of lamination packs forming a core in another illustrative embodiment.

The core 1 is not limited to forming by powder metal techniques, but instead may be formed by other methods. For example, FIG. 5 shows a core 1 in an illustrative embodiment that has an array of rectangular, or quasi-rectangular lamination packs 16 arranged in an annular ring. These lamination packs 16 may have a cross-section that resembles the cross-section of the core 1 shown in FIG. 2. Lamination packs used to form a magnetic core are well known in the art and typically have thin layers of magnetically soft (readily magnetizable) material stacked together with insulating material between adjacent layers so the flow of eddy currents between layers is resisted. FIG. 5 also shows the coil 3 extending around the central opening 15 and through the lamination packs 16. The individual packs may be split in two sections after the fashion of the previously described cores of FIG. 4 so as to facilitate assembly with a prewound coil. In this embodiment, the coil 3 is only partially surrounded by core material which is sufficient since the flux density in the radial core legs is nominally uniform and no greater at the outer extent of these legs than at the innermost station. However, it is possible to form each of the lamination packs 16 in a type of wedge shape so the coil 3 is more completely surrounded which may offer the advantage of providing a more robust core structure albeit at substantially greater expense required for the forming of laminations of tapered thickness. In addition, the faces of the lamination packs 16 near the central opening 15 may be curved or otherwise shaped to closely conform and maintain a uniform gap with the magnets in the movable element 2. For example, if the magnets in the movable element are annular as shown in FIG. 1, the inner faces of the lamination packs 16 may be curved to form a circular central opening 15. If the magnets have another shape, such as an octagonal cross-section, the inner faces of the lamination packs 16 may have an octagonal shape as shown in FIG. 5. In such a case, a spline or other mechanical means may be provided to inhibit rotation of the moving magnet field element.

Figure 6:
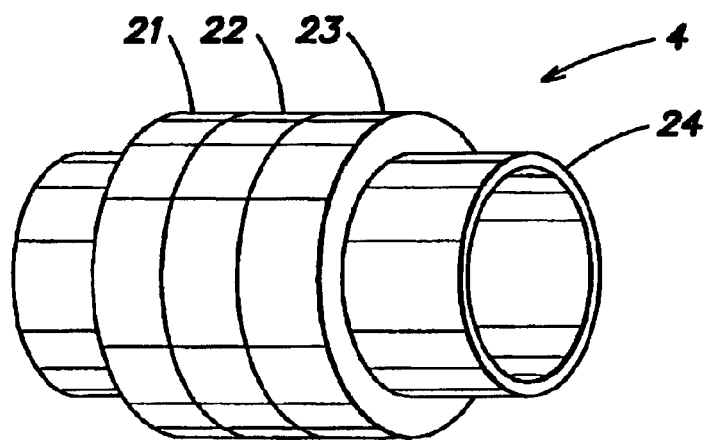
FIG. 6 shows a movable element having three annular magnets mounted to a back iron element.

FIG. 6 shows a perspective view of a movable element 4 in an illustrative embodiment. In this embodiment, the magnets 21, 22 and 23 have an annular shape and are mounted on a back iron element 24, e.g., a sleeve of magnetically soft material. The magnets 21, 22 and 23 may be secured to the back iron sleeve 24 in any suitable way, such as by adhesive or other bonding or be closely fitted, but unsecured, to the sleeve and retained by compressive force applied by non-magnetic collars, one of which may be bonded, e.g., brazed, to the sleeve at one end and the other held in place on the opposite end by a screw thread connection with the sleeve. The nominally axially magnetized side magnets 21 and 23 may be made of any suitable material and process to form a permanent magnet ring of such magnetization orientation, such as Hitachi grade HS-34DV sintered neodymium iron boron material. Radially magnetized center magnet 22 and the spring magnet 12 may be made of any suitable material and process to form a permanent magnet ring of such magnetization orientation, such as Hitachi grade HS33DR sintered neodymium iron boron material. Alternatively, lower cost, lower performance and bonded neodymium iron boron magnet rings may be used.

Figure 7:
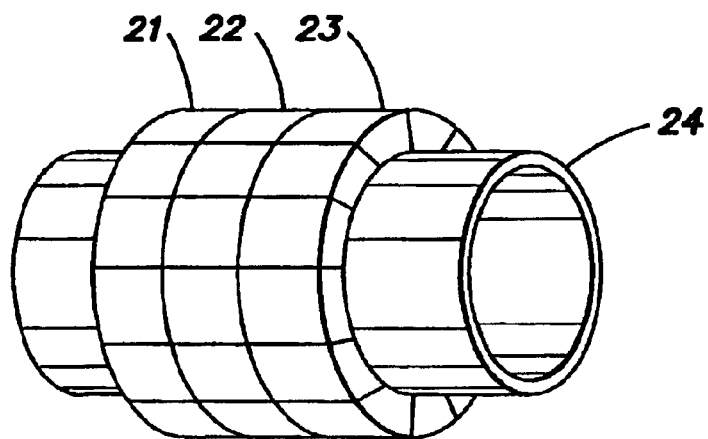
FIG. 7 shows a movable element having annular magnets formed from magnet segments.

In addition, the magnets 21, 22 and 23 are not limited to the annular arrangement shown in FIG. 6. For example, FIG. 7 shows another illustrative embodiment in which the magnets 21, 22, and 23 are assembled from magnet segments arranged on the back iron sleeve 24. The magnet segments may be joined together in any suitable way, such as by adhesive, a circumferential band around the outside surface of the magnet segments, etc. As discussed above, other magnet arrangements are also possible where the magnets present a cross-sectional shape different from the circular shape shown in FIGS. 5 and 6. For example, the magnets may be shaped to form a triangle, square, hexagon, or any other suitable polygonal shape. In such cases, the core 1 would typically be shaped to closely conform with at least a portion of the shape of the magnets and mechanical means may be provided to inhibit rotation of the moving field element about the longitudinal axis. Although in these embodiments, the magnets 21, 22 and 23 are hollow, i.e., have some void formed in the magnets, the magnets may be made solid. However, solid magnets are not necessarily required to provide suitable operating characteristics.

Figure 8:
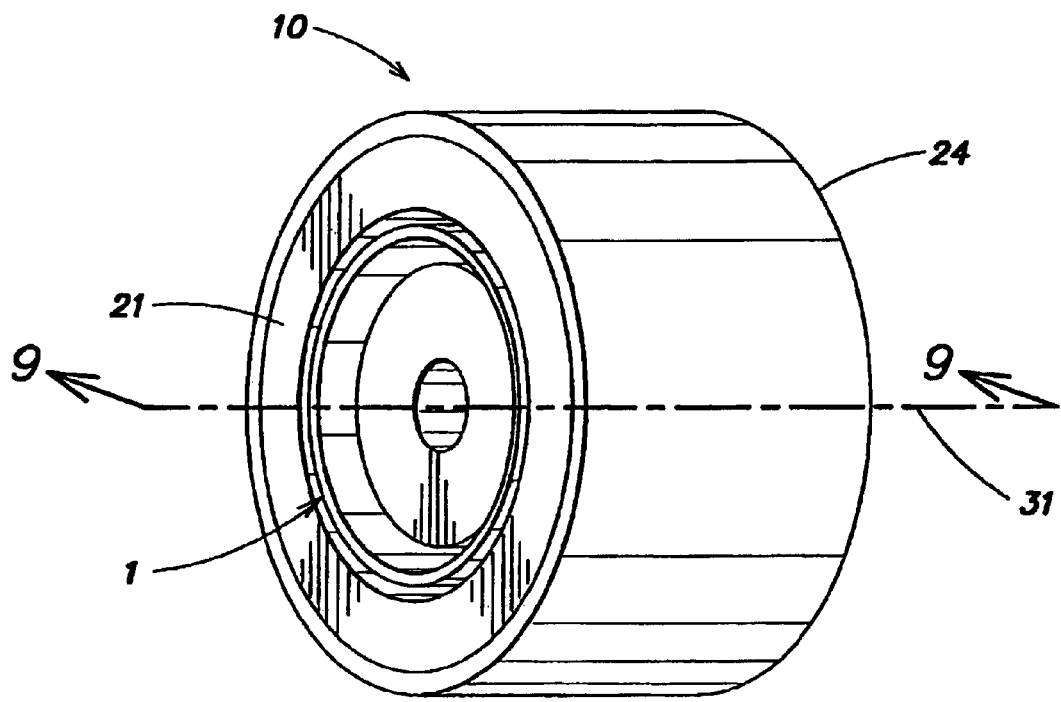
FIG. 8 shows a schematic view of another linear electrical machine in accordance with the invention.
Figure 9:
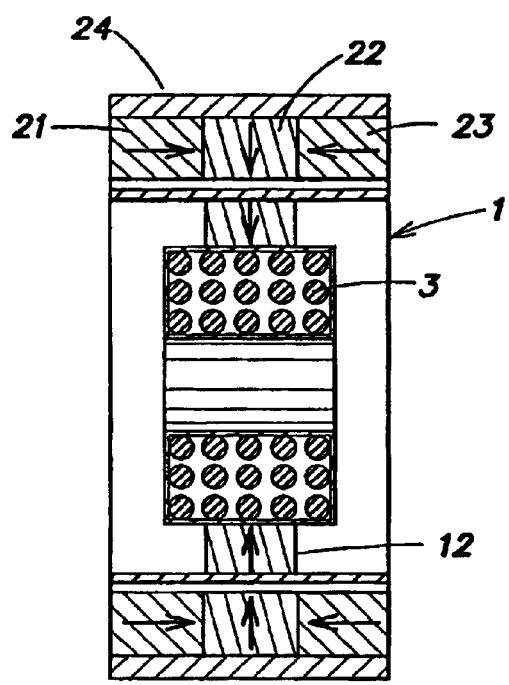
FIG. 9 is a cross-sectional view of the linear electrical machine shown in FIG. 8.

Although various embodiments are described above in which a movable element carries magnets that move relative to a core-coil assembly, it is also possible that the core-coil assembly be moved relative to the magnets. Further, the core-coil assembly may be positioned within the magnets in an arrangement opposite to that shown in FIG. 1. For example, FIG. 8 shows a linear electrical machine 10 that has a core-coil assembly 1 positioned inside of an annular magnet array along a longitudinal axis 31. FIG. 9 shows a cross-sectional view of the machine 10 along the line 9—9 in FIG. 8. The operation of this illustrative embodiment is similar to that in FIGS. 1 and 2, except that the annular magnets 21, 22 and 23 in FIGS. 8 and 9 are external to the core 1 and coil 3. Thus, as the magnets 21, 22 and 23 move along the longitudinal axis 31 relative to the core 1 and the coil 3, a current may be induced in the coil 3 (or a current in the coil 3 may cause the movable element 2 to move). The same configuration of FIGS. 8 and 9 may also be arranged so that the core 1 and coil 3 move along the longitudinal axis 31 relative to the magnets 21, 22 and 23.

In another embodiment, two or more linear electrical machines may be ganged together in series or parallel to increase the total power capability of the resulting combination. Thus, a single movable element may include two or more sets of three magnets with each set of magnets having the arrangement shown in FIG. 2. Each of the magnet sets may cooperate with a corresponding core-coil armature assemblies to generate electric power or be driven by a magnetic flux created by the coil and core.

Although aspects of the invention are not limited to any particular embodiment described, one embodiment found to be particularly effective for use with a Stirling engine power source has a configuration like that shown in FIGS. 1 and 2. In this embodiment, the core 1 has an overall diameter of approximately 6 to 24 cm, a width along the longitudinal axis 31 of approximately 2.5 to 10 cm, and a diameter at the central opening 15 of approximately 2 to 8 cm. The magnets 21, 22 and 23 are annular rings and have an overall diameter of approximately 2 to 8 cm, a length l of approximately one third that of the peak displacement of the moving field element and a radial thickness of approximately 0.6 to 1.0 times the length l. The left or right displacement of the movable element 2 may be limited to less than the length l of the magnets 21, 22 and 23, e.g., 0.8 cm. Said another way, the total stroke length of the movable element 2 may be less than twice the length l of each of the magnets 21, 22 or 23. The core is made of a sintered powder material and has a clam-shell arrangement, as discussed above. A spring magnet 12 is provided with the core 1 and is made in a way similar to the center magnet 22. The magnets are made of a sintered neodymium iron boron material, as discussed above, having an energy product of at least 30 MGOe. The radially magnetized magnets 22 and 12 are made by the process described above available from Hitachi USA, or a similar process for providing annular, radially magnetized magnets of sintered neodymium iron boron material. The magnets 21, 22 and 23 are made as a single piece annular ring, i.e., are not segmented, and are mounted on a soft magnetic back iron sleeve. Other proportional sizes of the device are nominally those shown in FIG. 2, although the drawings are not to scale.

Having thus described several aspects of at least one embodiment of this invention, it is to be appreciated various alterations, modifications, and improvements will readily occur to those skilled in the art. For example, the embodiments of the linear electric machine described above are fully scalable. That is, although the drawings are not precisely to scale, the overall size of the linear electric machine may be adjusted between a wide range of values (e.g., the core having a diameter of 2 cm or less up to 50 cm or more) with the proportional dimensions of the various parts of the machine remaining approximately that shown in FIGS. 1 and 2. However, the proportional sizes of the parts of the machine may also be adjusted in accordance with some aspects of the invention. Such alterations, modifications, and improvements are intended to be part of this disclosure, and are intended to be within the spirit and scope of the invention. Accordingly, the foregoing description and drawings are by way of example only.

What is claimed is:

1. A linear electrical machine comprising:
   a coil adapted to carry electrical current;
   a core disposed at least partially around the coil that provides a relatively low reluctance path for a magnetic flux, the core having a central opening; and
   a movable element having a longitudinal axis adapted to linearly reciprocate in the central opening along the longitudinal axis, the movable element having only first, second and third magnets arranged along the longitudinal axis, the first magnet being adjacent the second magnet, and the second magnet being adjacent the third magnet, each of the first, second and third magnets having a different magnetic orientation.

2. The machine of claim 1, wherein none of the first, second and third magnets have a magnetic orientation such that a north pole of the magnet is oriented radially inward.

3. The machine of claim 1, wherein each magnet is hollow and has an annular shape or a polygonal cross-sectional shape.

4. The machine of claim 1, further comprising a back iron element disposed inside the magnets.

5. The machine of claim 1, wherein the core includes two halves that are assembled together in a clam-shell type arrangement to receive coil inside.

6. The machine of claim 1, further comprising a spring magnet that urges one of the first, second and third magnets to align with a portion of the core.

7. The machine of claim 6, wherein the spring magnet urges the second magnet to align with the spring magnet.

8. The machine of claim 1, wherein the first and third magnets have a north pole parallel to the longitudinal axis, and the second annular magnet has a north pole perpendicular to the longitudinal axis.

9. The machine of claim 1, wherein the second magnet has a north pole oriented radially outward, and the first and third magnets each have a north pole oriented toward second magnet.

10. The machine of claim 1, wherein each of the first, second and third magnets have a length in a direction parallel to the longitudinal axis greater than one-half of a peak displacement of the movable element from a central position.

13

11. A linear electrical machine comprising:
a coil adapted to carry electrical current;
a core disposed at least partially around the coil that provides a relatively low reluctance path for a magnetic flux, the core having an annular shape with a central opening;
a movable element having a longitudinal axis adapted to linearly reciprocate in the central opening along the longitudinal axis, the movable element having three magnets arranged along the longitudinal axis and adjacent each other, the magnets each having a different magnetic orientation such that the magnetic orientations of adjacent magnets are within 90 degrees of each other; and
a soft magnetic material disposed within the magnets that provides a path for flux driven by a magnetic field generated by the magnets, wherein none of the magnets included with the movable element have a magnetic orientation such that a north pole of the magnet is oriented radially inward.

12. A linear electrical machine comprising:
a coil adapted to carry electrical current;
a core disposed at least partially around the coil that provides a relatively low reluctance path for a magnetic flux, the core having an annular shape with a central opening;
a movable element having a longitudinal axis adapted to linearly reciprocate in the central opening along the longitudinal axis, the movable element having three magnets arranged along the longitudinal axis and adjacent each other, the magnets each having a different magnetic orientation such that the magnetic orientations of adjacent magnets are within 90 degrees of each other; and
a soft magnetic material disposed within the magnets that provides a path for flux driven by a magnetic field generated by the magnets, wherein each magnet has an annular shape.

13. A linear electrical machine comprising:
a coil adapted to carry electrical current;
a core disposed at least partially around the coil that provides a relatively low reluctance path for a magnetic flux, the core having an annular shape with a central opening:
a movable element having a longitudinal axis adapted to linearly reciprocate in the central opening along the longitudinal axis, the movable element having three magnets arranged along the longitudinal axis and adjacent each other, the magnets each having a different magnetic orientation such that the magnetic orientations of adjacent magnets are within 90 degrees of each other; and
a soft magnetic material disposed within the magnets that provides a path for flux driven by a magnetic field generated by the magnets, wherein the soft magnetic material comprises a sleeve disposed inside the magnets.

14. A linear electrical machine comprising:
a coil adapted to carry electrical current;
a core disposed at least partially around the coil that provides a relatively low reluctance path for a magnetic flux, the core having an annular shape with a central opening;
a movable element having a longitudinal axis adapted to linearly reciprocate in the central opening along the longitudinal axis, the movable element having three magnets arranged along the longitudinal axis and adjacent each other, the magnets each having a different magnetic orientation such that the magnetic orientations of adjacent magnets are within 90 degrees of each other; and
a soft magnetic material disposed within the magnets that provides a path for flux driven by a magnetic field generated by the magnets, wherein each of the three magnets have a length in a direction parallel to the longitudinal axis greater than one-half a peak displacement of the movable element from a central position.

15. A linear electrical machine comprising:
a coil adapted to carry electrical current;
a core disposed in relation to the coil to provide a path for a magnetic flux adjacent the coil; and
first, second and third magnets arranged along a longitudinal axis to interact with a magnetic flux in the core which links with the coil, the first magnet being adjacent the second magnet, and the second magnet being adjacent the third magnet, each of the first, second and third magnets having a different magnetic orientation such that one of the magnets has a north pole oriented approximately perpendicular to the longitudinal axis and the other two magnets have a north pole oriented approximately parallel to the longitudinal axis;
wherein all magnets having a magnetic orientation approximately perpendicular to the longitudinal axis are oriented so the north pole of all such magnets is either radially inward or radially outward, and at least one of the magnets and the coil is arranged to move relative to the other in a linear direction parallel to the longitudinal axis, wherein none of the magnets included with the movable element have a magnetic orientation such that a north pole of the magnet is oriented radially inward.

16. A linear electrical machine comprising:
a coil adapted to carry electrical current;
a core disposed in relation to the coil to provide a path for a magnetic flux adjacent the coil; and
first, second and third magnets arranged along a longitudinal axis to interact with a magnetic flux in the core which links with the coil, the first magnet being adjacent the second magnet, and the second magnet being adjacent the third magnet, each of the first, second and third magnets having a different magnetic orientation such that one of the magnets has a north pole oriented approximately perpendicular to the longitudinal axis and the other two magnets have a north pole oriented approximately parallel to the longitudinal axis;
wherein all magnets having a magnetic orientation approximately perpendicular to the longitudinal axis are oriented so the north pole of all such magnets is either radially inward or radially outward, and at least one of the magnets and the coil is arranged to move relative to the other in a linear direction parallel to the longitudinal axis, wherein each magnet has an annular shape.

17. A linear electrical machine comprising:
a coil adapted to carry electrical current;
a core disposed in relation to the coil to provide a path for a magnetic flux adjacent the coil; and
first, second and third magnets arranged along a longitudinal axis to interact with a magnetic flux in the core which links with the coil, the first magnet being adjacent the second magnet, and the second magnet being adjacent the third magnet, each of the first, second and third magnets having a different magnetic orientation such that one of the magnets has a north pole oriented approximately perpendicular to the longitudinal axis and the other two magnets have a north pole oriented approximately parallel to the longitudinal axis;

wherein all magnets having a magnetic orientation approximately perpendicular to the longitudinal axis are oriented so the north pole of all such magnets is either radially inward or radially outward, and at least one of the magnets and the coil is arranged to move relative to the other in a linear direction parallel to the longitudinal axis, wherein the magnets are annular magnets and a soft magnetic material is disposed inside or outside the magnets.

18. A linear electrical machine comprising:

a coil adapted to carry electrical current;

a core disposed in relation to the coil to provide a path for a magnetic flux adjacent the coil; and first, second and third magnets arranged along a longitudinal axis to interact with a magnetic flux in the core which links with the coil, the first magnet being adjacent the second magnet, and the second magnet being adjacent the third magnet, each of the first, second and third magnets having a different magnetic orientation such that one of the magnets has a north pole oriented approximately perpendicular to the longitudinal axis and the other two magnets have a north pole oriented approximately parallel to the longitudinal axis;

wherein all magnets having a magnetic orientation approximately perpendicular to the longitudinal axis are oriented so the north pole of all such magnets is either radially inward or radially outward, and at least one of the magnets and the coil is arranged to move relative to the other in a linear direction parallel to the longitudinal axis, wherein the magnets include a first annular magnet adjacent a second annular magnet, and a third annular magnet adjacent the second annular magnet, the first and third annular magnets have a north pole parallel to the longitudinal axis, and the second annular magnet has a north pole perpendicular to the longitudinal axis.

19. A linear electrical machine comprising:

a coil adapted to carry electrical current;

a core disposed in relation to the coil to provide a path for a magnetic flux adjacent the coil; and first, second and third magnets arranged along a longitudinal axis to interact with a magnetic flux in the core which links with the coil, the first magnet being adjacent the second magnet, and the second magnet being adjacent the third magnet, each of the first, second and third magnets having a different magnetic orientation such that one of the magnets has a north pole oriented approximately perpendicular to the longitudinal axis and the other two magnets have a north pole oriented approximately parallel to the longitudinal axis;

wherein all magnets having a magnetic orientation approximately perpendicular to the longitudinal axis are oriented so the north pole of all such magnets is either radially inward or radially outward, and at least one of the magnets and the coil is arranged to move relative to the other in a linear direction parallel to the longitudinal axis, wherein the second annular magnet has a north pole oriented radially outward, and the first and third annular magnets each have a north pole oriented toward second annular magnet.

20. A linear electrical machine comprising:

a coil adapted to carry electrical current;

a core disposed in relation to the coil to provide a path for a magnetic flux adjacent the coil; and first, second and third magnets arranged along a longitudinal axis to interact with a magnetic flux in the core which links with the coil, the first magnet being adjacent the second magnet, and the second magnet being adjacent the third magnet, each of the first, second and third magnets having a different magnetic orientation such that one of the magnets has a north pole oriented approximately perpendicular to the longitudinal axis and the other two magnets have a north pole oriented approximately parallel to the longitudinal axis;

wherein all magnets having a magnetic orientation approximately perpendicular to the longitudinal axis are oriented so the north pole of all such magnets is either radially inward or radially outward, and at least one of the magnets and the coil is arranged to move relative to the other in a linear direction parallel to the longitudinal axis, wherein each of the magnets has a length in a direction parallel to the longitudinal axis greater than one-half a maximum amount of relative movement between the magnets and the coil along the longitudinal axis.

21. A linear electrical machine comprising:

a coil adapted to carry electrical current;

a core disposed in relation to the coil to provide a path for a magnetic flux adjacent the coil; and first, second and third magnets arranged along a longitudinal axis to interact with a magnetic flux in the core linking with the coil, the first magnet being adjacent the second magnet, and the second magnet being adjacent the third magnet, each of the first, second and third magnets having a different magnetic orientation;

wherein at least one of the magnets and the coil is arranged to move relative to the other in a linear direction parallel to the longitudinal axis, and the first, second and third magnets each have a length in the longitudinal direction that is greater than one-half of a maximum amount of relative movement of the magnets and the coil along the longitudinal axis.

22. The machine of claim 21, wherein none of the magnets included with the movable element have a magnetic orientation such that a north pole of the magnet is oriented in a direction away from the core.

23. The machine of claim 21, wherein each magnet comprises a plurality of separate magnet segments arranged in an annular configuration.

24. The machine of claim 21, wherein the magnets are annular magnets and a soft magnetic material is disposed inside or outside the magnets.

25. The machine of claim 21, wherein the core includes two halves that are assembled together in a clam-shell type arrangement to receive coil inside.

26. The machine of claim 21, further comprising a spring magnet that urges one of the three magnets to align with a portion of the core.

27. The machine of claim 26, wherein the spring magnet urges one of the magnets to align with the spring magnet.

28. The machine of claim 21, wherein the magnets include a first annular magnet adjacent a second annular magnet, and a third annular magnet adjacent the second annular magnet, the first and third annular magnets have a north pole parallel to the longitudinal axis, and the second annular magnet has a north pole perpendicular to the longitudinal axis.

29. The machine of claim 28, wherein the second annular magnet has a north pole oriented radially outward, and the first and third annular magnets each have a north pole oriented toward second annular magnet.

30. The machine of claim 21, wherein the core and coil are movable within an opening in the magnets.

31. A linear electrical machine comprising:

a coil adapted to carry electrical current;

a core disposed in relation to the coil to provide a path for a magnetic flux linking with the coil, the core having a gap;

first, second and third magnets arranged along a longitudinal axis to interact with a magnetic flux in the core linking with the coil, the first magnet being adjacent the second magnet, and the second magnet being adjacent the third magnet, one of the first, second and third magnets having a magnetic orientation such that a north pole of the magnet is oriented parallel to the longitudinal axis; and a fourth magnet positioned in the gap of the core and having a magnetic orientation;

wherein at least one of the first, second and third magnets and the core is arranged to move relative to the other in a linear direction parallel to the longitudinal axis, and the magnetic orientation of the fourth magnet is arranged to urge one of the first, second and third magnets to align with the core.

32. The machine of claim 31, wherein none of the magnets included with the movable element have a magnetic orientation such that a north pole of the magnet is oriented in a direction away from the core.

33. The machine of claim 31, wherein each magnet comprises a plurality of separate magnet segments arranged in an annular configuration.

34. The machine of claim 31, wherein the magnets are annular magnets and a soft magnetic material is disposed inside or outside the magnets.

35. The machine of claim 31, wherein the core includes two halves that are assembled together in a clam-shell type arrangement to receive coil inside.

36. The machine of claim 31, wherein the spring magnet urges one of the magnets to align with the spring magnet.

37. The machine of claim 36, wherein the spring magnet urges the second magnet to align with the spring magnet.

38. The machine of claim 31, wherein the magnets include a first annular magnet adjacent a second annular magnet, and a third annular magnet adjacent the second annular magnet, the first and third annular magnets have a north pole parallel to the longitudinal axis, and the second annular magnet has a north pole perpendicular to the longitudinal axis.

39. The machine of claim 38, wherein the second annular magnet has a north pole oriented radially outward, and the first and third annular magnets each have a north pole oriented toward second annular magnet.

40. The machine of claim 39, wherein the core comprises a central opening, and the magnets move inside the central opening.

41. The machine of claim 31, wherein each of the magnets have a length in a direction parallel to the longitudinal axis greater than one-half of a peak displacement of the magnets from a central position along the longitudinal axis.

* * * * *